(12) United States Patent
Srinivas et al.

(10) Patent No.: US 9,467,938 B1
(45) Date of Patent: Oct. 11, 2016

(54) USING DRCLOCKS FOR CONDUCTING CALL ADMISSION CONTROL

(75) Inventors: Shilpa Kowdley Srinivas, Herndon, VA (US); Anoop K. Goyal, Overland Park, KS (US); Bhagwan Khanka, Lenexa, KS (US); Duane A. Tomka, Wauwatosa, WI (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 2205 days.

(21) Appl. No.: 12/432,736

(22) Filed: Apr. 29, 2009

(51) Int. Cl.
*H04W 48/20* (2009.01)
*H04W 48/02* (2009.01)

(52) U.S. Cl.
CPC ............ *H04W 48/20* (2013.01); *H04W 48/02* (2013.01)

(58) Field of Classification Search
CPC ... H04W 48/02; H04W 48/08; H04W 48/16; H04W 48/18; H04W 48/20
USPC .......................................................... 370/334
See application file for complete search history.

(56) References Cited

U.S. PATENT DOCUMENTS

| | | | |
|---|---|---|---|
| 5,649,299 A | 7/1997 | Battin et al. | |
| 5,890,067 A | 3/1999 | Chang et al. | |
| 5,995,923 A | 11/1999 | Mermelstein et al. | |
| 6,014,568 A | 1/2000 | Alperovich et al. | |
| 6,021,328 A | 2/2000 | Curtis et al. | |
| 6,081,229 A | 6/2000 | Soliman et al. | |
| 6,148,207 A | 11/2000 | Baum | |
| 6,161,022 A | 12/2000 | Hwang et al. | |
| 6,172,974 B1 | 1/2001 | Tseng et al. | |
| 6,208,631 B1 | 3/2001 | Kim | |
| 6,223,041 B1 | 4/2001 | Egner et al. | |
| 6,243,590 B1 | 6/2001 | Reddy et al. | |
| 6,272,358 B1 | 8/2001 | Brent et al. | |
| 6,418,147 B1 | 7/2002 | Wiedeman | |
| 6,480,541 B1 | 11/2002 | Girod et al. | |
| 6,501,736 B1 | 12/2002 | Smolik et al. | |
| 6,522,888 B1 | 2/2003 | Garceran et al. | |
| 6,526,029 B1 | 2/2003 | Zhong | |
| 6,577,616 B1 | 6/2003 | Chaudry et al. | |
| 6,591,110 B1 | 7/2003 | Kim et al. | |

(Continued)

FOREIGN PATENT DOCUMENTS

| | | | | |
|---|---|---|---|---|
| WO | WO 2004/004249 A1 | 1/2004 | | |
| WO | 2004/028095 | 4/2004 | | |
| WO | WO 2004028095 A1 * | 4/2004 | ............ | H04L 12/56 |

OTHER PUBLICATIONS

U.S. Appl. No. 12/141,569, Notice of Allowance dated Sep. 28, 2011.

(Continued)

*Primary Examiner* — Luat Phung
*Assistant Examiner* — Saad A Waqas

(57) ABSTRACT

Methods and systems are provided for using DRCLocks for conducting call admission control. In an embodiment, an access node provides service to a plurality of access terminals on a carrier in a coverage area, where the plurality of access terminals does not include a first access terminal. The access node receives a request for new service on the carrier in the coverage area from the first access terminal over an air interface, and responsively determines whether an aggregate-DRCLock condition is met. If the aggregate-DRCLock condition is met, the access node denies the request for new service.

25 Claims, 2 Drawing Sheets

(56) References Cited

U.S. PATENT DOCUMENTS

| | | |
|---|---|---|
| 6,606,496 B1 | 8/2003 | Salvarani et al. |
| RE38,244 E | 9/2003 | Han et al. |
| 6,625,119 B1 | 9/2003 | Schuster et al. |
| 6,718,183 B1 | 4/2004 | Blust et al. |
| 6,745,012 B1 | 6/2004 | Ton et al. |
| 6,757,520 B2 | 6/2004 | Attar et al. |
| 6,775,252 B1 | 8/2004 | Bayley |
| 6,839,356 B2 | 1/2005 | Barany et al. |
| 6,856,954 B1 | 2/2005 | Su |
| 6,944,454 B1 | 9/2005 | Lee et al. |
| 6,970,437 B2 | 11/2005 | Lott et al. |
| 6,970,871 B1 | 11/2005 | Rayburn |
| 6,975,609 B1 | 12/2005 | Khaleghi et al. |
| 6,980,523 B1 | 12/2005 | Lipford et al. |
| 7,058,124 B2 | 6/2006 | Koo |
| 7,099,283 B2 | 8/2006 | Matta et al. |
| 7,120,447 B1 | 10/2006 | Chheda et al. |
| 7,130,287 B2 | 10/2006 | Nounin et al. |
| 7,130,311 B2 | 10/2006 | Yavuz et al. |
| 7,142,562 B2 | 11/2006 | Yavuz et al. |
| 7,190,958 B1 | 3/2007 | Yarkosky |
| 7,209,758 B1 | 4/2007 | Moll et al. |
| 7,236,796 B2 | 6/2007 | Soliman |
| 7,245,915 B2 | 7/2007 | Matta et al. |
| 7,328,027 B1 | 2/2008 | Mangal |
| 7,394,789 B2 * | 7/2008 | Sakawa et al. ............... 370/331 |
| 7,406,319 B2 | 7/2008 | Kostic et al. |
| 7,411,923 B2 | 8/2008 | Attar et al. |
| 7,411,974 B2 | 8/2008 | Attar et al. |
| 7,426,180 B2 | 9/2008 | Xu |
| 7,426,395 B2 | 9/2008 | Stephens |
| 7,433,682 B1 | 10/2008 | Moll et al. |
| 7,440,431 B2 | 10/2008 | Sindhushayana et al. |
| 7,474,627 B2 | 1/2009 | Chheda et al. |
| 7,486,645 B2 | 2/2009 | Li et al. |
| 7,496,058 B2 | 2/2009 | Kim et al. |
| 7,742,768 B2 | 6/2010 | Liu et al. |
| 7,746,816 B2 | 6/2010 | Attar et al. |
| 7,751,839 B2 * | 7/2010 | Bowers et al. ............... 455/509 |
| 7,921,348 B2 * | 4/2011 | Seidel et al. ................. 714/751 |
| 7,953,048 B2 | 5/2011 | Yoon et al. |
| 8,040,803 B1 | 10/2011 | Pawar et al. |
| 8,094,623 B2 * | 1/2012 | Attar et al. ................... 370/332 |
| 2002/0061749 A1 | 5/2002 | Hunzinger |
| 2002/0151310 A1 | 10/2002 | Chung et al. |
| 2002/0191693 A1 | 12/2002 | Nakagaki |
| 2003/0017831 A1 * | 1/2003 | Lee et al. ....................... 455/453 |
| 2003/0064741 A1 | 4/2003 | Silva et al. |
| 2003/0072278 A1 * | 4/2003 | Wu et al. ....................... 370/329 |
| 2003/0095551 A1 | 5/2003 | Gotoh et al. |
| 2003/0114172 A1 | 6/2003 | Soliman |
| 2003/0117956 A1 | 6/2003 | Lee |
| 2003/0129982 A1 | 7/2003 | Perini |
| 2003/0163558 A1 | 8/2003 | Cao et al. |
| 2003/0195006 A1 | 10/2003 | Choong et al. |
| 2004/0017860 A1 | 1/2004 | Liu |
| 2004/0037291 A1 | 2/2004 | Attar et al. |
| 2004/0057420 A1 | 3/2004 | Curcio et al. |
| 2004/0071086 A1 | 4/2004 | Haumont et al. |
| 2004/0109424 A1 | 6/2004 | Chheda |
| 2004/0179525 A1 | 9/2004 | Balasubramanian et al. |
| 2004/0196852 A1 | 10/2004 | Aksu et al. |
| 2004/0213182 A1 | 10/2004 | Huh et al. |
| 2004/0218533 A1 | 11/2004 | Kim et al. |
| 2004/0259565 A1 | 12/2004 | Lucidarme |
| 2005/0032522 A1 | 2/2005 | Soong et al. |
| 2005/0052996 A1 | 3/2005 | Houck et al. |
| 2005/0111397 A1 | 5/2005 | Attar et al. |
| 2005/0130663 A1 | 6/2005 | Hong et al. |
| 2005/0153695 A1 | 7/2005 | Cho |
| 2005/0159165 A1 | 7/2005 | Argyropoulos et al. |
| 2005/0201289 A1 | 9/2005 | Smolinske et al. |
| 2005/0250509 A1 | 11/2005 | Choksi |
| 2005/0286440 A1 | 12/2005 | Strutt et al. |
| 2006/0077994 A1 | 4/2006 | Spindola et al. |
| 2006/0121855 A1 | 6/2006 | Dillon |
| 2006/0126509 A1 | 6/2006 | Abi-Nassif et al. |
| 2006/0159045 A1 | 7/2006 | Ananthaiyer |
| 2006/0159051 A1 | 7/2006 | English |
| 2006/0182062 A1 | 8/2006 | Sdralia et al. |
| 2006/0223585 A1 | 10/2006 | Legg |
| 2006/0229087 A1 | 10/2006 | Davis, III et al. |
| 2006/0250953 A1 | 11/2006 | Mooney et al. |
| 2006/0252429 A1 | 11/2006 | Chen et al. |
| 2006/0268764 A1 | 11/2006 | Harris |
| 2006/0291383 A1 | 12/2006 | Bi et al. |
| 2007/0060165 A1 | 3/2007 | Black et al. |
| 2007/0099648 A1 | 5/2007 | Kim et al. |
| 2007/0109967 A1 | 5/2007 | Ha |
| 2007/0127407 A1 | 6/2007 | Attar et al. |
| 2007/0127522 A1 | 6/2007 | Lundh et al. |
| 2007/0177510 A1 | 8/2007 | Natarajan et al. |
| 2007/0178906 A1 | 8/2007 | Gao et al. |
| 2007/0183427 A1 | 8/2007 | Nylander et al. |
| 2007/0197223 A1 | 8/2007 | Jung et al. |
| 2007/0201438 A1 | 8/2007 | Yoon et al. |
| 2007/0201439 A1 | 8/2007 | Sun et al. |
| 2007/0242702 A1 | 10/2007 | Shim |
| 2007/0274257 A1 | 11/2007 | Bae et al. |
| 2008/0008093 A1 | 1/2008 | Wang et al. |
| 2008/0049699 A1 * | 2/2008 | Li et al. ....................... 370/342 |
| 2008/0049706 A1 | 2/2008 | Khandekar et al. |
| 2008/0080414 A1 | 4/2008 | Thubert et al. |
| 2008/0130495 A1 | 6/2008 | Dos Remedios et al. |
| 2008/0137614 A1 | 6/2008 | Kwon |
| 2008/0186846 A1 | 8/2008 | Stephenson et al. |
| 2008/0186862 A1 | 8/2008 | Corbett et al. |
| 2008/0188228 A1 | 8/2008 | Pecen et al. |
| 2008/0207170 A1 | 8/2008 | Khetawat et al. |
| 2008/0233967 A1 | 9/2008 | Montojo et al. |
| 2008/0247450 A1 | 10/2008 | Alexander et al. |
| 2008/0280615 A1 | 11/2008 | Vinayakray-Jani |
| 2009/0059790 A1 | 3/2009 | Calvert et al. |
| 2009/0086629 A1 | 4/2009 | Zhang et al. |
| 2009/0088157 A1 | 4/2009 | Aaron |
| 2009/0141683 A1 | 6/2009 | Grinshpun et al. |
| 2009/0170547 A1 | 7/2009 | Raghothaman et al. |
| 2009/0187690 A1 | 7/2009 | Smart et al. |
| 2009/0257361 A1 | 10/2009 | Deshpande et al. |
| 2009/0262720 A1 | 10/2009 | Kwon et al. |
| 2009/0285159 A1 * | 11/2009 | Rezaiifar et al. ............. 370/328 |
| 2009/0288145 A1 | 11/2009 | Huber et al. |
| 2010/0014487 A1 | 1/2010 | Attar et al. |
| 2010/0189096 A1 | 7/2010 | Flynn et al. |
| 2010/0240373 A1 | 9/2010 | Ji et al. |
| 2010/0271962 A1 | 10/2010 | Han et al. |
| 2010/0296407 A1 | 11/2010 | Medvedev et al. |
| 2010/0309861 A1 | 12/2010 | Gorokhov et al. |
| 2011/0053596 A1 | 3/2011 | Wohlert et al. |
| 2011/0085607 A1 | 4/2011 | Dhandu et al. |
| 2011/0116419 A1 | 5/2011 | Cholas et al. |
| 2011/0292785 A1 | 12/2011 | Hardin |
| 2012/0044908 A1 | 2/2012 | Spinelli et al. |

OTHER PUBLICATIONS

U.S. Appl. No. 12/388,199, Final Office Action dated Oct. 11, 2011.
U.S. Appl. No. 12/478,318, Non-Final Office Action dated Oct. 27, 2011.
U.S. Appl. No. 12/397,855, Non-Final Office Action dated Dec. 5, 2011.
Unpublished U.S. Appl. No. 12/141,569, filed Jun. 18, 2008 entitled "Method for Initiating Handoff of a Wireless Access Terminal Based on the Reverse Activity Bit".
Unpublished U.S. Appl. No. 11/746,229, filed May 9, 2007 entitled "Using VoIP-Quality Metrics to Dynamically Adjust the EV-DO Reverse Activity Bit".
Unpublished U.S. Appl. No. 12/350,694, filed Jan. 8, 2009 entitled "Using Packet-Transport Metrics for Call-Admission Control".
Unpublished U.S. Appl. No. 12/397,855, filed Mar. 4, 2009 entitled "Using Packet-Transport Metrics for Setting DRCLocks".
Unpublished U.S. Appl. No. 12/494,999, filed Jun. 30, 2009 entitled

(56) References Cited

OTHER PUBLICATIONS

"Implementing Quality of Service (QoS) by Using Hybrid ARQ (HARQ) Response for Triggering the EV-DO Reverse Activity Bit (RAB)".
Unpublished U.S. Appl. No. 12/507,913, filed Jul. 23, 2009 entitled "Achieving Quality of Service (QoS) by Using the Reverse Activity Bit (RAB) in Creation of Neighbor Lists for Selected Access Terminals".
First Action Interview Pilot Program Pre-Interview Communication from U.S. Appl. No. 11/746,229, mailed Dec. 30, 2009.
Pre-Interview Communication mailed on Dec. 30, 2009 in U.S. Appl. No. 11/746,229.
First Action Interview Summary mailed on Jun. 2, 2010 in U.S. Appl. No. 11/746,229.
Notice of Allowance mailed on Aug. 3, 2010 in U.S. Appl. No. 11/746,229.
Non-Final Office Action mailed on Oct. 12, 2010 in U.S. Appl. No. 12/397,855.
Final Office Action mailed on Apr. 1, 2011 in U.S. Appl. No. 12/397,855.
Non-Final Office Action mailed on Mar. 22, 2011 in U.S. Appl. No. 12/141,569.
Non-Final Office Action mailed on Jun. 22, 2010 in U.S. Appl. No. 12/350,694.
Final Office Action mailed on Dec. 9, 2010 in U.S. Appl. No. 12/350,694.
Non-Final Office Action mailed on Feb. 18, 2011 in U.S. Appl. No. 12/350,694.
U.S. Appl. No. 12/388,199, filed Feb. 18, 2009.
U.S. Appl. No. 12/478,318, filed Jun. 4, 2009.
U.S. Appl. No. 12/538,624, filed Aug. 10, 1999.
U.S. Appl. No. 12/756,629, filed Apr. 8, 2010.
U.S. Appl. No. 12/731,895, filed Mar. 25, 2010.
U.S. Appl. No. 11/746,229, Interview Summary dated Apr. 6, 2010.
U.S. Appl. No. 12/388,199, Non-Final Office Action dated Mar. 30, 2011.
U.S. Appl. No. 12/478,318, Non-Final Office Action dated Dec. 8, 2010.
Ferrus, R. et al., "Evaluation of a Cell Selection Framework for Radio Access Networks considering Blackhaul Resource Limitations," The 18th Annual IEEE International Symposium on Personal, Indoor and Mobile Radio Communications (PIMRC'07).
Mino, E. et al., "IST-4-027756 WINNER II, D4.8.3, Integration of Cooperation on WINNER II System Concept," Information Society Technologies, pp. 1-102, Nov. 29, 2007.
Conklin, G. et al., "Video Coding for Streaming Media Delivery on the Internet," IEE Transactions on Circuits and Systems for Video Technology, 11(3):269-281 (Mar. 2001).
International Search Report and Written Opinion from International Application No. PCT/US2007/009296, dated Oct. 17, 2007.
Liu, Xiu et al., "Experiences in a 3G Network: Interplay between the Wireless Channel and Applications," MobiCom'08, pp. 211-222 (Sep. 14-19, 2008).
Yeo, Woon-Yong et al., "Traffic Management of High-Speed CDMA Systems Base on Loan Prediction," IEICE Electronics Express, 6(7):389-394 (Apr. 10, 2009).
3rd Generation Partnership Project 2, "cdma2000 High Rate Packet Data Air Interface," 3GPP2 C.S0024-0, v. 4.0 (Oct. 2002).
3rd Generation Partnership Project 2, "cdma2000 High Rate Packet Data Air Interface," 3GPP2 C.S0024-A, v. 3.0 (Sep. 2006).
Notice of Allowance for U.S. Appl. No. 12/350,694 dated Jun. 10, 2011.
U.S. Appl. No. 12/538,624, Final Office Action dated Dec. 19, 2011.
U.S. Appl. No. 12/478,318, Notice of Allowance dated Jan. 30, 2012.
Rosenberg, J. et al., "SIP: Session Initiation Protocol," Network Working Group, Request for Comments: 3261, Jun. 2002, pp. 1-265.
3rd Generation Partnership Project, "cdma2000 Femtocell Network: 1x and IMS Network Aspects," 3GPP2 X. S0059-2000-0, Version 1.0, Jan. 2010.
Kjellberg, Richard, "Analysis of an AIS Implementation in Tokyo Bay," web.archive.org/web/20090427053120/http://www.gpc.se/tokyo/tokyo.htm (Apr. 27, 2009).
Xing, Jianping et al., "Research and Integration of Marine Embedded AIS Information Terminal," Proceedings of the 7th World Congress on Intelligent Control and Automation, Jun. 25-27, 2008, Chongqing, China, pp. 3586-3589.
Openwave, "Overview of Location Technologies," Nov. 19, 2002, 12 pages.
U.S. Appl. No. 12/731,895, Non Final Office Action dated Mar. 23, 2012.
U.S. Appl. No. 12/494,999, Notice of Allowance dated Mar. 30, 2012.
U.S. Appl. No. 12/756,629, Non Final Office Action dated Mar. 29, 2012.

\* cited by examiner

US 9,467,938 B1

USING DRCLOCKS FOR CONDUCTING CALL ADMISSION CONTROL

BACKGROUND

Many people use mobile stations, such as cell phones and personal digital assistants, to communicate with cellular wireless networks, which typically provide communication services such as voice, text messaging, and packet-data communication to these mobile stations. The mobile stations and networks typically communicate with each other over a radio frequency (RF) air interface according to a wireless protocol such as 1×RTT CDMA, EV-DO, WiMax, etc.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

OVERVIEW

A mobile station may engage in packet-data communication over one or more packet-data networks with one or more different types of endpoints, some examples of which include other mobile stations, landline phones, conference servers, gateways, etc. In the case of landline phones, a media gateway may reside between a packet-data network and a circuit-switched network such as the PSTN. For simplicity of explanation, examples involving mobile stations communicating with one respective endpoint over a packet-data network via one BTS, one BSC, and one PDSN may be described herein; however, the present disclosure could just as well be applied to more complex examples, perhaps involving communication sessions between mobile stations and multiple endpoints, such as may be the case in a conference call.

Furthermore, a given instance of packet-data communication engaged in by a mobile station may be of any type. One popular type is Voice over IP (VoIP), which may have a user experience that is similar to voice calls conducted over the PSTN via a BTS, a BSC, and an MSC. VoIP calls (i.e. sessions) may also or instead take the form of push-to-talk (PTT) sessions, known to those in the art. In general, as used herein, "VoIP" encompasses any type of voice-over-packet communication that may be engaged in by mobile stations. More generally, the methods and systems described herein may be applied to any type of data communication, though doing so with respect to latency-sensitive types such as VoIP, videoconferencing, streaming media, etc. may yield the greatest dividends with respect to user satisfaction.

When a base station—and a wireless network in general—provides packet-data service (e.g. VoIP service) to a given mobile station, the base station is providing at least two services to that mobile station. The first is wireless service over the air interface, and the other is transport service (i.e. connectivity) over one or more packet-data networks, such as direct transport service over the service provider's privately-operated core packet-data network, as well as indirect transport service over a public packet-data network such as or including the Internet.

Note that, in contexts where wireless service is provided according to a protocol known as EV-DO (perhaps according to IS-856, Revision 0 and/or IS-856, Revision A, both of which are hereby incorporated herein by reference in their entirety), mobile stations are often referred to as access terminals, and BSCs are often referred to as RNCs (radio network controllers). Furthermore, a combination of an RNC and one or more BTSs is often referred to as an access node. This terminology will be adopted for the balance of this written description, though again for illustration and not to limit the described embodiments to any particular protocol.

As known to those of skill in the art, in EV-DO networks, access terminals use a reverse-link channel known as the DRC channel to request forward-link service from a particular network sector. Typically, an access terminal will specify the sector (or coverage area, more generally) from which the access terminal is requesting forward-link service by transmitting a particular value known as a DRC cover in the reverse-link DRC channel, where the DRC cover sent by the access terminal indicates a particular sector. Incidentally, the access terminal also includes data in the reverse-link DRC channel that indicates a particular data rate or particular packet-transmission format, depending on the implemented release or revision of IS-856.

In any event, upon receiving a request for forward-link service (i.e. a DRC request) from an access terminal via the reverse-link DRC channel, a given EV-DO network sector may grant the request and provide forward-link service, in which case the access terminal receives forward-link service from that sector until the access terminal selects another sector, powers down, ceases communication, and/or some other event occurs. If, however, the sector (or more generally perhaps, the access node) determines that the requested sector is not able or willing to provide forward-link service to the access terminal, the sector typically transmits a value to the access terminal known as a DRCLock. In current implementations, the DRCLock is sent when a potential serving sector determines that it is not properly receiving (e.g. cannot properly decode) the reverse-link DRC channel from the access terminal, and thus concludes that it is not a good candidate to provide forward-link service to the access terminal.

Essentially, then, the DRCLock is a message from a sector to an access terminal, informing the access terminal that, at least for the time being, the sector is not an option for providing forward-link service to the access terminal. The DRCLock typically takes the form of a bit, where one of the two possible values (referred to herein as the DRCLock being "set") indicates that the sector is not an option for providing forward-link service to the access terminal, and where the other of the two possible values (referred to herein as the DRCLock being "clear" or "cleared") indicates that the sector is an option for the access terminal. In response to detecting that a sector has set the DRCLock for an access terminal, the access terminal typically points its DRC channel at another sector (i.e. transmits a DRC cover corresponding to another sector). The access terminal may then periodically check whether the first sector has cleared its DRCLock for that access terminal and, if so, point its DRC cover back at that first sector.

Note that the serving network maintains what is known as an "active set" of sectors for each access terminal; and it is the sectors in a given access terminal's active set that will evaluate whether they are able to properly receive DRC transmissions from that access terminal: if a given sector is not, that sector will set a DRCLock for that access terminal and later reevaluate. Note as well that sectors can provide service on multiple carrier frequencies (carriers), and that a given instance of a carrier in a given sector may be referred to herein as a sector/carrier.

Furthermore, some possible causes of a DRCLock needing to be set are high reverse noise on a sector/carrier, weak reverse-link transmissions from an access terminal, fading conditions, improper link imbalance, etc. If a high number of access terminals on a sector/carrier are receiving DRCLocks from an access node, this is likely an indication of poor RF conditions on the sector/carrier. And poor RF conditions are even more strongly indicated if the aggregate number of DRCLocks on a sector/carrier stays high for a sustained period of time.

Furthermore, call-admission control refers to admitting or denying new users (i.e. access terminals) service in a given wireless coverage area, such as a cell or sector. In particular, call-admission control involves making decisions to grant or deny service to access terminals upon receiving requests for new service (e.g. call-origination messages, handoff requests, etc.) from access terminals not currently being served by an access node. Note that these decisions may be described as being made by the access node, which includes the possibilities of the decisions being made by a BTS, an RNC, some other entity, or perhaps by a combination thereof.

Note that, in current implementations, call-admission-control decisions are made based on air-interface conditions on a sector/carrier, but they are not made in such a manner that takes into account an aggregate number of DRCLocks (i.e. DRCLocks that are currently set) on a sector/carrier. Nor are they made in such a manner that takes into account the aggregate number of DRCLocks remaining high for a timeout period.

In accordance with the present methods and systems, however, an EV-DO access node may receive a request for service on a sector/carrier from an access terminal that is not currently receiving service on that sector/carrier (i.e. a request for new service). In response to receiving that request, the access node may identify how many (or perhaps what ratio of, percentage of, etc.) access nodes having that sector/carrier in their active set are currently being sent DRCLocks by the access node (i.e. the aggregate DRCLock). If the aggregate DRCLock exceeds a given threshold, the access node may deny the request for new service.

In some embodiments, the access node may include a time element in making the above-described determination. That is, the access node may, in response to determining that the aggregate DRCLock exceeds the threshold, start a timer: if, until expiration of the timer, the aggregate DRCLock remains above the threshold, the access node may deny the request for new service. In other embodiments, checking whether the aggregate DRCLock exceeds the threshold may involve checking whether the aggregate DRCLock has been above the threshold for at least a certain amount of time. And other examples are clearly possible as well.

Note that, in some embodiments, a dual-mode (e.g. EV-DO and 1×RTT CDMA ("1×")) access terminal that is denied service from a first network (e.g. an EV-DO network) may attempt to acquire resources from a second network (e.g. a 1× network).

And it should be noted that the above overview is intended to be illustrative and not limiting. Additional and/or different features may be present in some embodiments. And any description of a mobile station, access terminal, or other network element operating according to any particular protocol is by way of example and not limitation; any suitable wireless protocol(s) may be used, such as but not limited to 1×RTT CDMA, EV-DO, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Exemplary Architecture

Figure 1:
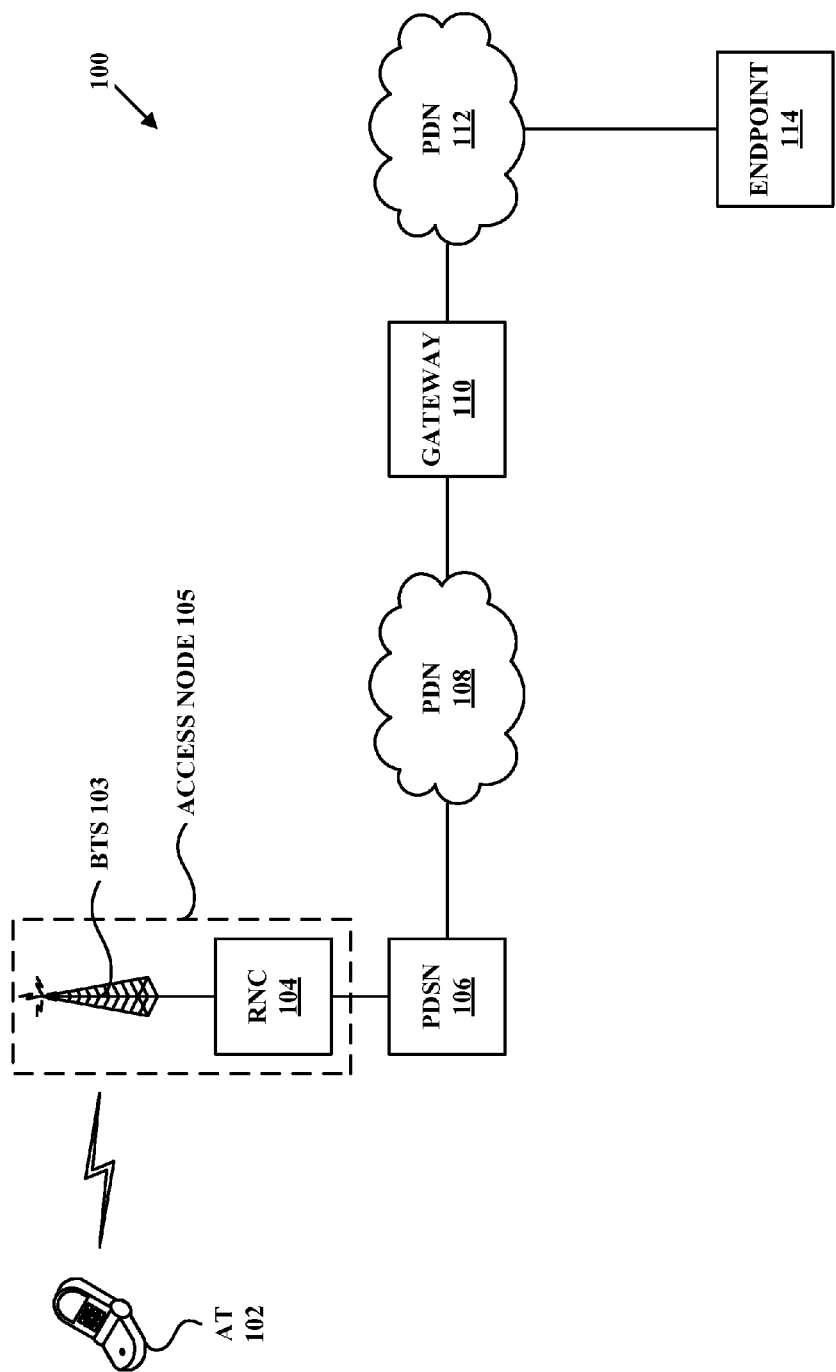
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node 105 (shown as comprising a BTS 103 and an RNC 104), a PDSN 106, a packet-data network (PDN) 108, a gateway 110, a PDN 112, and an endpoint 114. Note that additional entities not depicted in FIG. 1 could be present as well. As an example, there could be more than one access terminal in communication with access node 105; also, there could be additional entities in communication with PDN 108 and/or PDN 112. Also, there could be one or more routers, switches, other devices and/or networks making up at least part of one or more of the communication links.

Access terminal 102 may be any device arranged to carry out the access-terminal functions described herein, and may include a user interface, a wireless-communication interface, a processor, and data storage comprising instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1×RTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

BTS 103 may be any one or any combination of network elements arranged to carry out the BTS functions described herein, and may include a communication interface, a processor, and data storage comprising instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection), such as an Ethernet interface, for communicating with RNC 104.

RNC 104 may be any one or any combination of network elements arranged to carry out the RNC functions described herein. As such, RNC 104 may include a communication interface, a processor, and data storage comprising instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond.

Note that access node 105 may comprise BTS 103 and RNC 104, and may comprise one or more additional BTSs as well. In general, access node 105 provides wireless service to access terminals over an air interface, and uses a backhaul connection to provide transport service over PDN 108 (or perhaps PDN 108 and PDN 112) to those access terminals.

PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are certainly possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

Endpoint 114 may be any device arranged to carry out the endpoint functions described herein. As such, endpoint 114 may include a (wired and/or wireless) communication interface, a processor, and data storage comprising instructions executable by the processor for carrying out those endpoint functions. Endpoint 114 may be or include a media gateway (perhaps connected to the PSTN), a packet-based telephone, a personal computer, a PDA, a mobile station, an access terminal, a PTT server, a call server, and/or any other type of device capable of functioning as an endpoint of a VoIP—or other type of packet-data-communication—session in accordance with various embodiments.

2. Exemplary Operation

Figure 2:
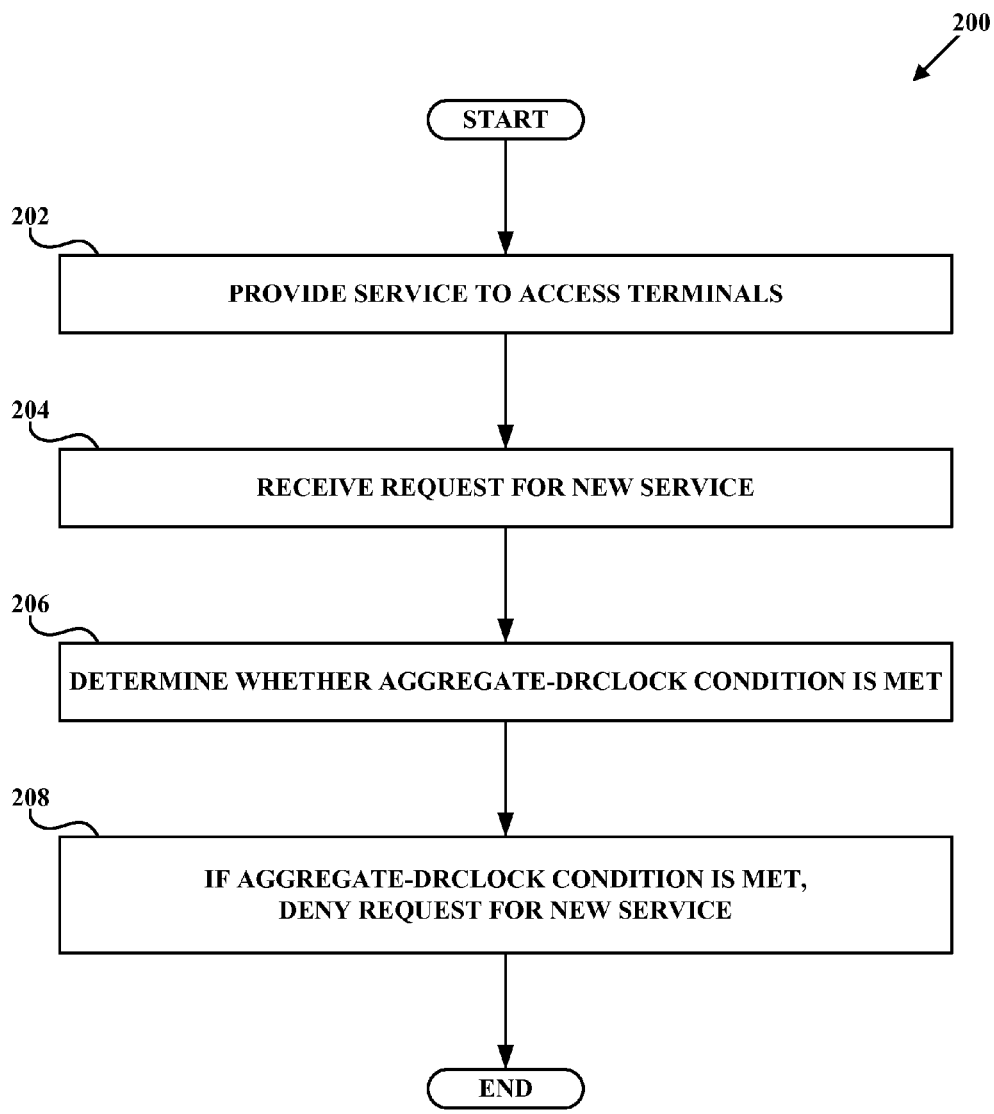
FIG. 2 is a flowchart of a method, in accordance with exemplary embodiments.

FIG. 2 depicts a flowchart of an exemplary method, in accordance with an exemplary embodiment. In some embodiments, as described below in connection with FIG. 2, method 200 may be carried out by an access node, such as access node 105. In other embodiments, the method may be carried out by another network entity mentioned herein, such as BTS 103, RNC 104, PDSN 106, some other network entity, or some combination thereof. In general, method 200 may be carried out by a base station, an access node, a BTS, a BSC, an RNC, an MSC, a PDSN, some other network entity, or perhaps some combination thereof.

As shown in FIG. 2, method 200 begins at step 202, where access node 105 provides service to a plurality of access terminals (not depicted) on a carrier in a coverage area (which may be a cell or a sector), wherein the plurality of access terminals does not include a first access terminal (here, access terminal 102). As noted above, access node 105 may be or include an EV-DO access node, the access terminals may be or include EV-DO access terminals, and the service may be or include EV-DO service (in compliance with at least one of IS-856, Release 0 and IS-856, Revision A). And access node 105 may include an RNC and at least one BTS.

At step 204, access node 105 receives a request for new service on the carrier in the coverage area from access terminal 102 over an air interface. The request for new service may be or include at least one of a call-origination message and a handoff request. In an embodiment, method 200 may only be carried out when the request for new service is associated with a certain type of packet-data communication (e.g. VoIP, PTT, teleconferencing, streaming media, etc.).

At step 206, in response to receiving the request for new service, access node 105 determines whether an aggregate-DRCLock condition is met. At step 208, if the aggregate-DRCLock condition is met, access node 105 denies the request for new service. In an embodiment, if the aggregate-DRCLock condition is not met, access node 105 grants the request for new service. In another embodiment, if (a) the aggregate-DRCLock condition is not met and (b) at least one additional condition (perhaps related to one or more factors such as air-interface conditions, capacity, etc.) is met, access node 105 grants the request for new service. And certainly variations on this are possible as well.

With respect to the aggregate-DRCLock condition that is evaluated in step 206, a number of possibilities exist. In one embodiment, the condition is whether access node 105 currently has a DRCLock set for at least a threshold number of access terminals in the plurality of access terminals. In another embodiment, the condition is whether access node 105 currently has a DRCLock set for at least a threshold percentage of access terminals in the plurality of access terminals. And certainly other possibilities exist as well.

In one embodiment, the condition is whether an aggregate-DRCLock sub-condition is met for a threshold period of time. Note that this sub-condition could be either of the options mentioned in the preceding paragraph, or another option. Furthermore, in an embodiment, the threshold period of time ends approximately when access node 105 receives the request for new service; that is, access node 105 may evaluate whether the sub-condition had prevailed for the previous second, 10 seconds, 30 seconds, or some other option. In another embodiment, the threshold period of time starts approximately when access node 105 receives the request for new service; that is, access node 105 may evaluate whether the sub-condition then prevails for the ensuing second, 10 seconds, 30 seconds, or some other option. And other possibilities exist.

3. Conclusion

Various exemplary embodiments have been described above. Those skilled in the art will understand, however, that changes and modifications may be made to those examples without departing from the scope of the claims.

The invention claimed is:

1. A method comprising:
an access node providing service to a plurality of access terminals on a carrier in a coverage area, wherein the plurality of access terminals does not include a first access terminal;
the access node receiving a request for new service on the carrier in the coverage area from the first access terminal over an air interface;
in response to receiving the request for new service, the access node determining whether an aggregate-DRCLock condition is met; and
if the aggregate-DRCLock condition is met, the access node denying the request for new service.

2. The method of claim 1, wherein the access node comprises an EV-DO access node, wherein the access terminals comprise EV-DO access terminals, and wherein the service comprises EV-DO service.

3. The method of claim 1, wherein the access node comprises a radio network controller (RNC) and at least one base transceiver station (BTS).

4. The method of claim 1, wherein the service complies with at least one of IS-856, Release 0 and IS-856, Revision A.

5. The method of claim 1, wherein the coverage area is a cell or a sector.

6. The method of claim 1, wherein the request for new service is a call-origination message or a handoff request.

7. The method of claim 1, wherein the aggregate-DRCLock condition is whether the access node currently has a DRCLock set for at least a threshold number of access terminals in the plurality of access terminals.

8. The method of claim 1, wherein the aggregate-DRCLock condition is whether the access node currently has a DRCLock set for at least a threshold percentage of access terminals in the plurality of access terminals.

9. The method of claim 1, wherein the aggregate-DRCLock condition is whether an aggregate-DRCLock sub-condition is met for a threshold period of time.

10. The method of claim 9, wherein the aggregate-DRCLock sub-condition is whether the access node currently has a DRCLock set for at least a threshold number of access terminals in the plurality of access terminals.

11. The method of claim 9, wherein the aggregate-DRCLock sub-condition is whether the access node currently has a DRCLock set for at least a threshold percentage of access terminals in the plurality of access terminals.

12. The method of claim 9, wherein the threshold period of time ends approximately when the access node receives the request for new service.

13. The method of claim 9, wherein the threshold period of time starts approximately when the access node receives the request for new service.

14. The method of claim 1, further comprising:
if the aggregate-DRCLock condition is not met, granting the request for new service.

15. The method of claim 1, further comprising:
if (a) the aggregate-DRCLock condition is not met and (b) at least one additional condition is met, granting the request for new service.

16. The method of claim 1, carried out only if the request for new service is associated with a type of packet-data communication selected from a set of types of packet-data communication.

17. The method of claim 16, wherein the set of types of packet-data communication includes at least one of VoIP, PTT, teleconferencing, and streaming media.

18. An access node comprising:
a wireless-communication interface;
a backhaul connection;
a processor; and
data storage comprising instructions executable by the processor for carrying out functions including:
providing service to a plurality of access terminals on a carrier in a coverage area, wherein the plurality of access terminals does not include a first access terminal;

receiving a request for new service on the carrier in the coverage area from the first access terminal over an air interface;

in response to receiving the request for new service, determining whether an aggregate-DRCLock condition is met; and if the aggregate-DRCLock condition is met, denying the request for new service.

19. The access node of claim 18, wherein the access node comprises an EV-DO access node, wherein the access terminals comprise EV-DO access terminals, wherein the service comprises EV-DO service, and wherein the service complies with at least one of IS-856, Release 0 and IS-856, Revision A.

20. The access node of claim 18, wherein the access node comprises a radio network controller (RNC) and at least one base transceiver station (BTS).

21. The access node of claim 18, wherein the request for new service is a call-origination message or a handoff request.

22. The access node of claim 18, wherein the aggregate-DRCLock condition is whether the access node currently has a DRCLock set for at least a threshold number of access terminals in the plurality of access terminals.

23. The access node of claim 18, wherein the aggregate-DRCLock condition is whether the access node currently has a DRCLock set for at least a threshold percentage of access terminals in the plurality of access terminals.

24. The access node of claim 18, wherein the aggregate-DRCLock condition is whether an aggregate-DRCLock sub-condition is met for a threshold period of time, and wherein the threshold period of time either starts or ends approximately when the access node receives the request for new service.

25. The access node of claim 18, further comprising:

if (a) the aggregate-DRCLock condition is not met and (b) zero or more additional conditions are met, granting the request for new service.

* * * * *